United States Patent
Pavanetto (12) 
(10) Patent No.: US 6,709,260 B1
(45) Date of Patent: Mar. 23, 2004

(54) HYDRAULIC PRESS APPARATUS WITH IMPROVED CONTROL OF THE OLEO-DYNAMIC CIRCUIT THEREOF

(75) Inventor: Jader Pavanetto, Mestre (IT)

(73) Assignee: SIPA S.p.A., Vittorio Veneto (IT)

( * ) Notice: Subject to any disclaimer, the term of this patent is extended or adjusted under 35 U.S.C. 154(b) by 0 days.

(21) Appl. No.: 09/980,591

(22) PCT Filed: Apr. 26, 2000

(86) PCT No.: PCT/EP00/03723

§ 371 (c)(1),
(2), (4) Date: Dec. 4, 2001

(87) PCT Pub. No.: WO00/74921

PCT Pub. Date: Dec. 14, 2000

(30) Foreign Application Priority Data

Jun. 4, 1999 (IT) .......................................... PN99A0047

(51) Int. Cl.[7] .......................... B29C 45/67; F15B 15/14; B30B 1/32
(52) U.S. Cl. .................... 425/451.9; 164/343; 425/595; 100/269.18
(58) Field of Search .............................. 425/451.9, 595; 164/341, 343

(56) References Cited

U.S. PATENT DOCUMENTS

| | | | | |
|---|---|---|---|---|
| 5,336,462 A | * | 8/1994 | Wohlrab | 425/595 |
| 5,547,366 A | * | 8/1996 | Hehl | 425/595 |
| 5,674,541 A | | 10/1997 | Svoboda | 425/190 |
| 6,120,724 A | * | 9/2000 | Glaesener | 425/595 |

FOREIGN PATENT DOCUMENTS

| | | |
|---|---|---|
| DE | 42 43 735 | 7/1993 |
| EP | 0554662 | 8/1993 |
| EP | 0562181 | 9/1993 |
| GB | 843328 | 8/1960 |
| JP | 61-268423 | 11/1986 |

OTHER PUBLICATIONS

Patent Abstracts of Japan, vol. 011, No. 125 (M–582), Apr. 18, 1987.

* cited by examiner

*Primary Examiner*—James P. Mackey
(74) *Attorney, Agent, or Firm*—Wenderoth, Lind & Ponack, L.L.P.

(57) ABSTRACT

A hydraulic press apparatus comprises: a lower plate and an upper plate adapted to be driven toward the lower plate via operation of a motion a position control device; a hollow cylinder under the lower plate, the hollow cylinder having an upper edge tightly engaged with a lower surface of the lower plate; a guide column connected to the upper plate, the guide column having a lower end portion that defines a rod for a first piston adapted to slide within the hollow cylinder, and the guide column defining an inner cylindrical cavity that extends through the first piston, with the inner cylindrical cavity being filled with hydraulic fluid; a hole extending through the lower plate, the hole being adapted to slidably accommodate said guide column; an aperture in a side surface of the hollow cylinder, the aperture allowing a volume defined between the lower plate and the first piston to communicate with a hydraulic device that is adapted to apply a hydraulic pressure within the volume when the first piston is in a lower position; a plunger piston adapted to slide within the inner cylindrical cavity, the plunger piston including an upper cylindrical portion that has a diameter such that the upper cylindrical portion is capable of plugging the inner cylindrical cavity, the plunger piston also including a lower portion that has a diameter smaller than the diameter of the upper cylindrical portion so as to prevent the lower portion from contacting walls defining the inner cylindrical cavity; and a through-bore allowing the inner cylindrical cavity to communicate with the volume when the upper cylindrical portion is at a level that is beneath a level of the through-bore.

32 Claims, 12 Drawing Sheets

HYDRAULIC PRESS APPARATUS WITH IMPROVED CONTROL OF THE OLEO-DYNAMIC CIRCUIT THEREOF

BACKGROUND OF THE INVENTION

The present invention pertains to a vertical hydraulic press apparatus adapted to most efficiently and effectively cause complementary half-molds to clamp together in both, processes used to form metal materials and processes aimed at injection-molding and forming thermoplastic materials.

A very wide variety and types of hydraulic press apparatuses are largely known to be currently available and in practical use. It can be easily noticed that simplicity in overall construction of such machines, and an easy and effective as possible control of operations thereof are among the most common requirements that engineers tend to comply with when designing these presses.

A basic schematic layout of a hydraulic press apparatus used for clamping half-molds during injection-molding processes for forming thermoplastic materials generally includes a guide column associated with a piston adapted to slide within a hydraulic cylinder. When an upper half-mold is moved vertically with respect to a stationary lower half-mold, hydraulic fluid that finds itself on a side of the piston is partially transferred, owing to displacement of the piston itself, to another side of the piston through an external circuit and at least a controlled valve.

Presence of such an external circuit, however, implies installation of a number of mechanical component parts, and further requires many precision machining operations to be performed. Such a need, along with requirements for the valve and related control circuits, make construction of such a press apparatus particularly complicated, expensive and demanding, and also quite delicate in its operation.

U.S. Pat. No. 5,204,047 and U.S. Pat. No. 5,302,108 are known to teach a method for making a particular type of hydraulic press apparatus using a support column for pistons so as to minimize overall space requirements of the press apparatus, wherein peculiarity of this press apparatus lies in its being provided with a plurality of pistons associated with a stationary differential piston.

Although a main purpose of the above two patents is actually reached with such a solution, the press apparatus of these patents is too complicated and expensive in its construction and delicate in its operation because of, particularly, a large number of hydraulic conduits that need to be closed and opened in a synchronized pattern.

BRIEF SUMMARY OF THE INVENTION

It is therefore a main purpose of the present invention to provide a vertical hydraulic press apparatus, particularly adapted for use in connection with plastic molding processes, which apparatus is compact, reliable in its operation, uses low-cost materials, construction requirements and component parts, and has a simple and reliable construction based on use of readily available techniques.

Such a type of press apparatus is obtained and implemented with features that are substantially described with particular reference to the appended claims.

Features and advantages of the present invention can more readily be understood from a description that is given below by way of a non-limiting example with reference to accompanying drawings, in which:

BRIEF DESCRIPTION OF THE DRAWINGS

FIGS. 1 through to 11 are schematical, vertical-section views of a press apparatus according to the present invention, during successive operating phases thereof.

DETAILED DESCRIPTION OF THE PREFERRED EMBODIMENTS

With reference to the above Figures, the press apparatus according to the present invention comprises:

a lower plate 1 and an upper plate 2 on which appropriate molds (not shown) are provided;

an actuation apparatus connected to the two plates 1, 2, and comprising a cylinder 3, a piston 4 and two conduits 5 and 6 adapted to selectively pump hydraulic fluid into two volumes of the cylinder, which volumes are delimited and separated from each other by the piston;

a hollow cylinder 7 provided under the lower plate 1 and arranged with its axis extending vertically, wherein the cylinder has its upper edge 8 arranged so as to tightly fit against a lower surface 9 of the lower plate 1;

a guide column 10 connected via an appropriate connection member 11 to the upper plate 2, and forming with its lower end portion 12 a rod of a piston 13 adapted to slide within the hollow cylinder 7 so that the guide column in its entirety is able to be driven to move vertically;

a bore 14 extending through the lower plate and adapted to accommodate the guide column 10 as it moves vertically;

an aperture 15 provided in a side surface of the hollow cylinder 7 and adapted to enable an inner volume 16, which is provided above the piston, to communicate with an appropriate member 17 that is adapted to apply a hydraulic pressure into the inner volume 16 when the piston 13 is in its lower position.

What has been described above corresponds to the state of the art and has only been recited here for reasons of better understanding the present invention.

According to the present invention, guide column 10 is provided with an inner cylindrical cavity 18 having its axis extending parallell to a direction of displacement of the column and opening at a lower end portion of the column.

Inside the cylindrical cavity 18 is arranged a sliding piston of a plunger type, which is formed by an upper cylindrical portion 20 and a lower portion 21.

The upper cylindrical portion 20 is so sized as to be able to plug the inner cylindrical cavity 18, while allowing piston to slide; moreover, the lower portion 21 of the piston is so sized as to extend downwardly by a definite amount, which shall be explained in greater detail later, with respect to the upper cylindrical portion, and has a width that is smaller than a width of the upper cylindrical portion so that the lower portion will not be able to interfere with or touch an inner wall of the inner cylindrical cavity 18.

A wall of the guide column 10 is provided, above a level of the piston 13, with a through-bore 22 that enables the inner volume 16 to communicate with the cylindrical cavity 18. It shall of course be appreciated that such a circumstance occurs when the plunger-type piston is displaced away from the through-bore, and a height of the upper cylindrical portion 20 of the plunger-type piston is furthermore at least equal to a height of the through-bore 22, so that the plunger-type piston is capable, in definite positions thereof, of closing the through-bore, thereby interrupting connection between the inner volume 16 and the cylindrical cavity 18.

Figure 1:
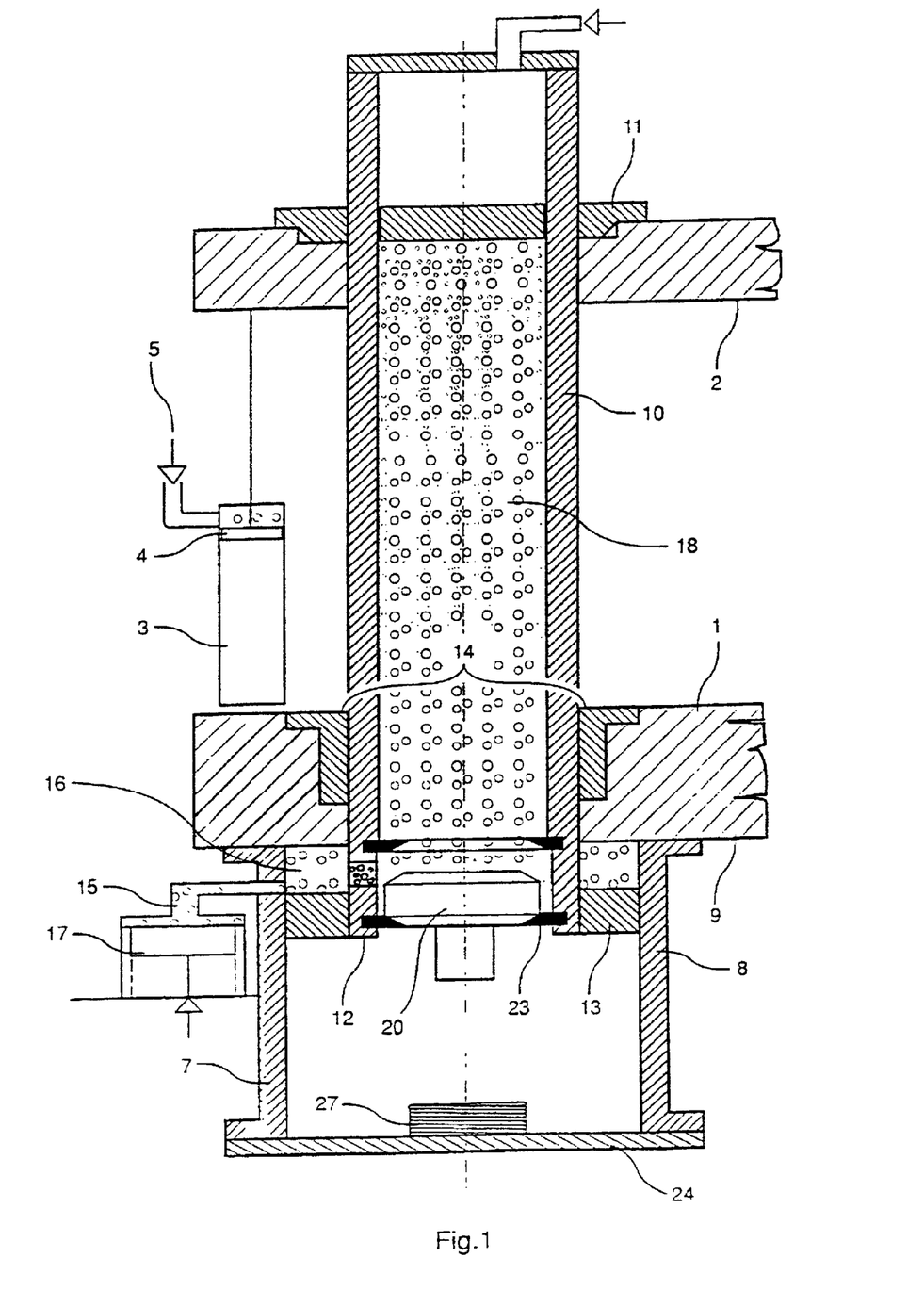
FIG. 1 shows a first phase of operation the press apparatus according to the present invention.
Figure 2:
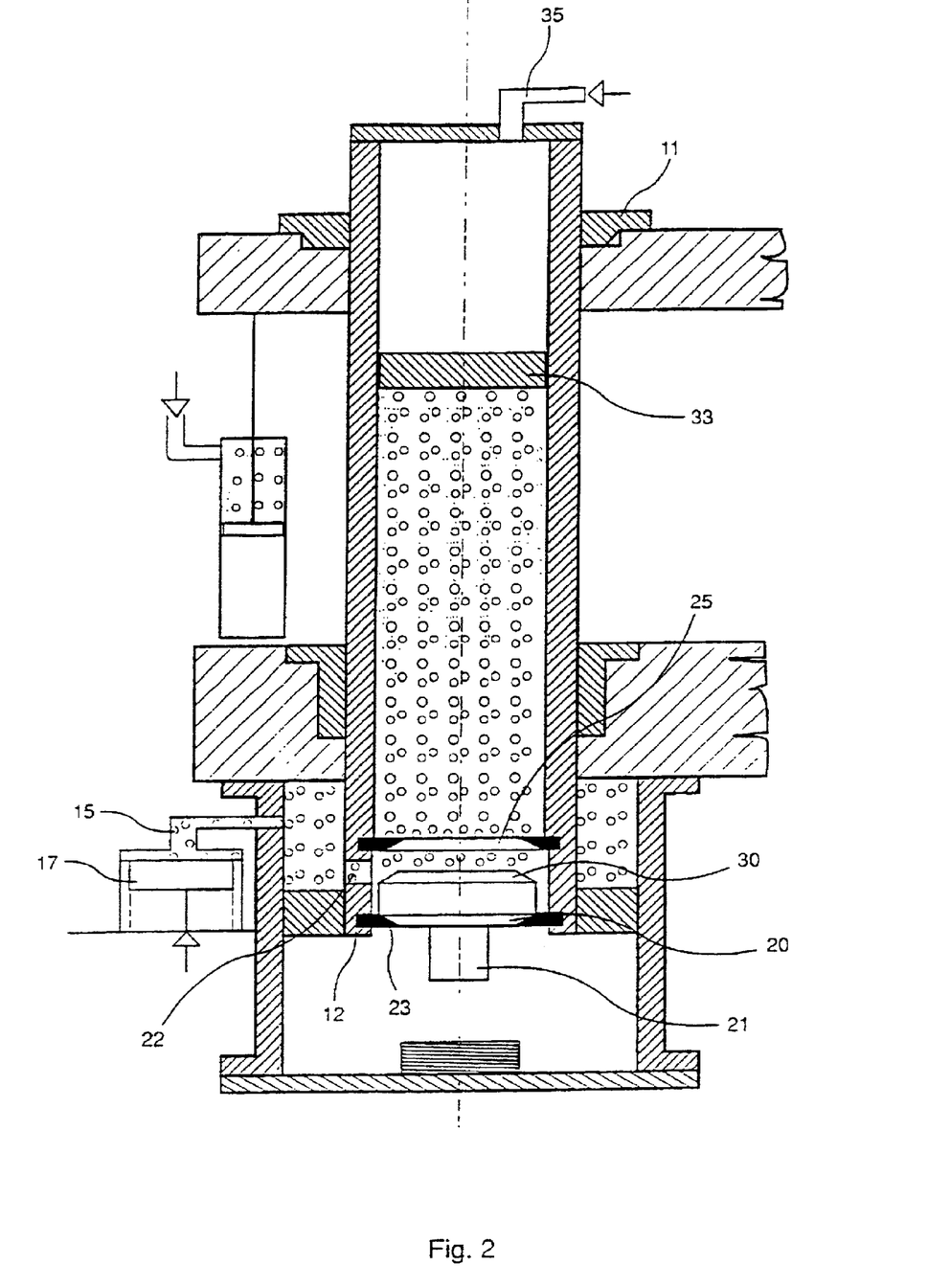
FIG. 2 shows a second phase of operation the press apparatus according to the present invention.
Figure 3:
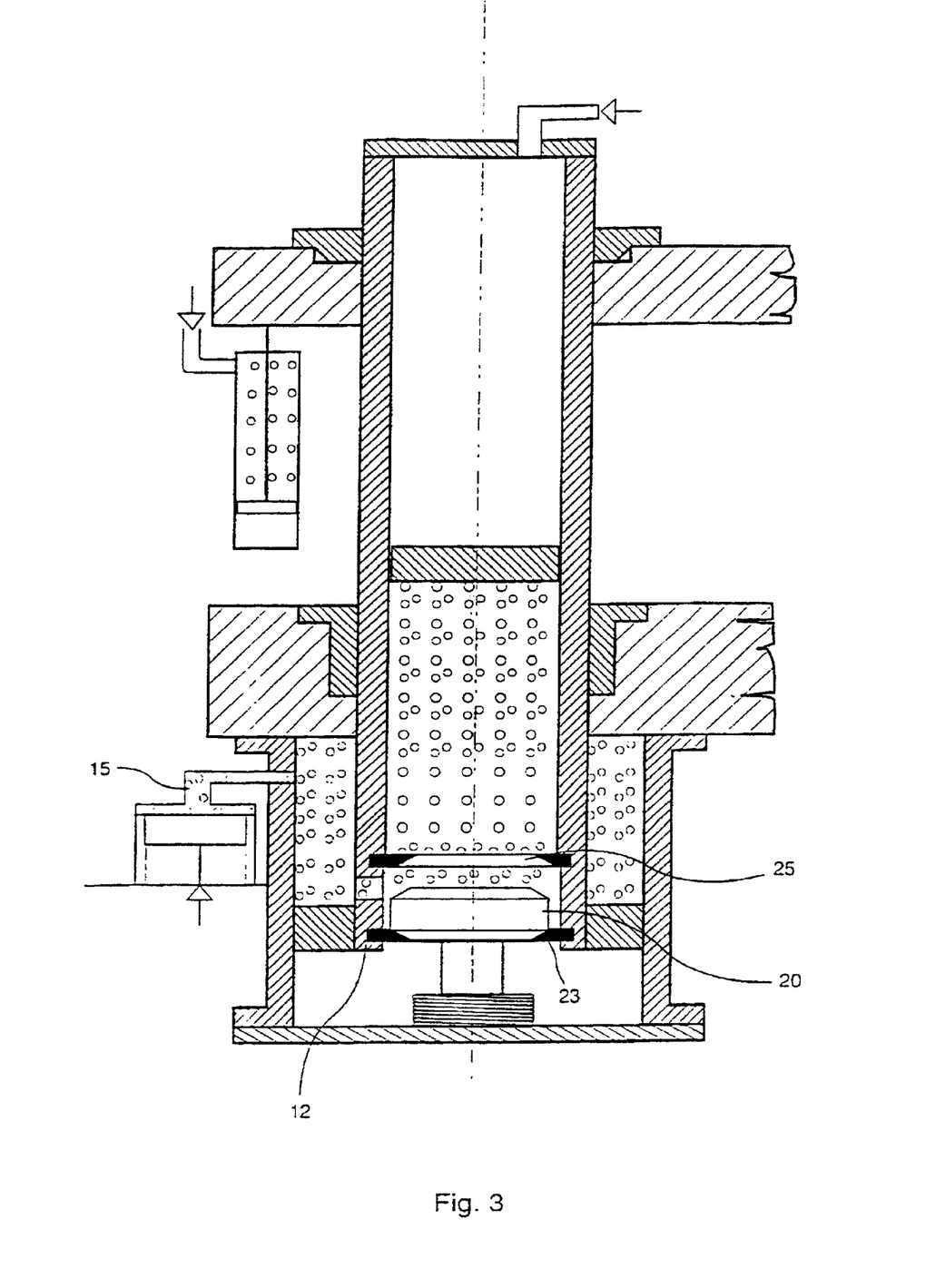
FIG. 3 shows a third phase of operation the press apparatus according to the present invention.
Figure 5:
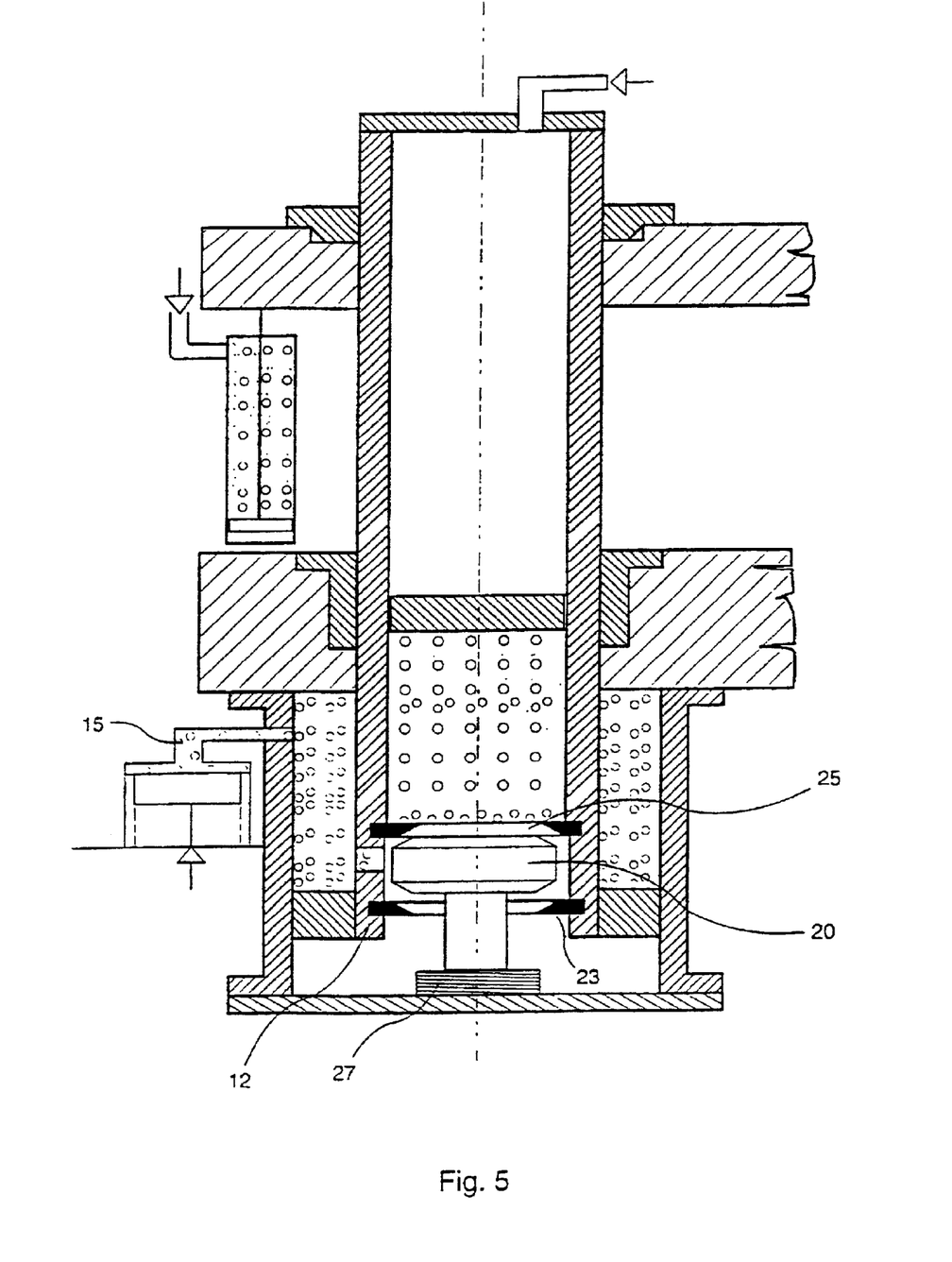
FIG. 5 shows a fifth phase of operation the press apparatus according to the present Invention.
Figure 6:
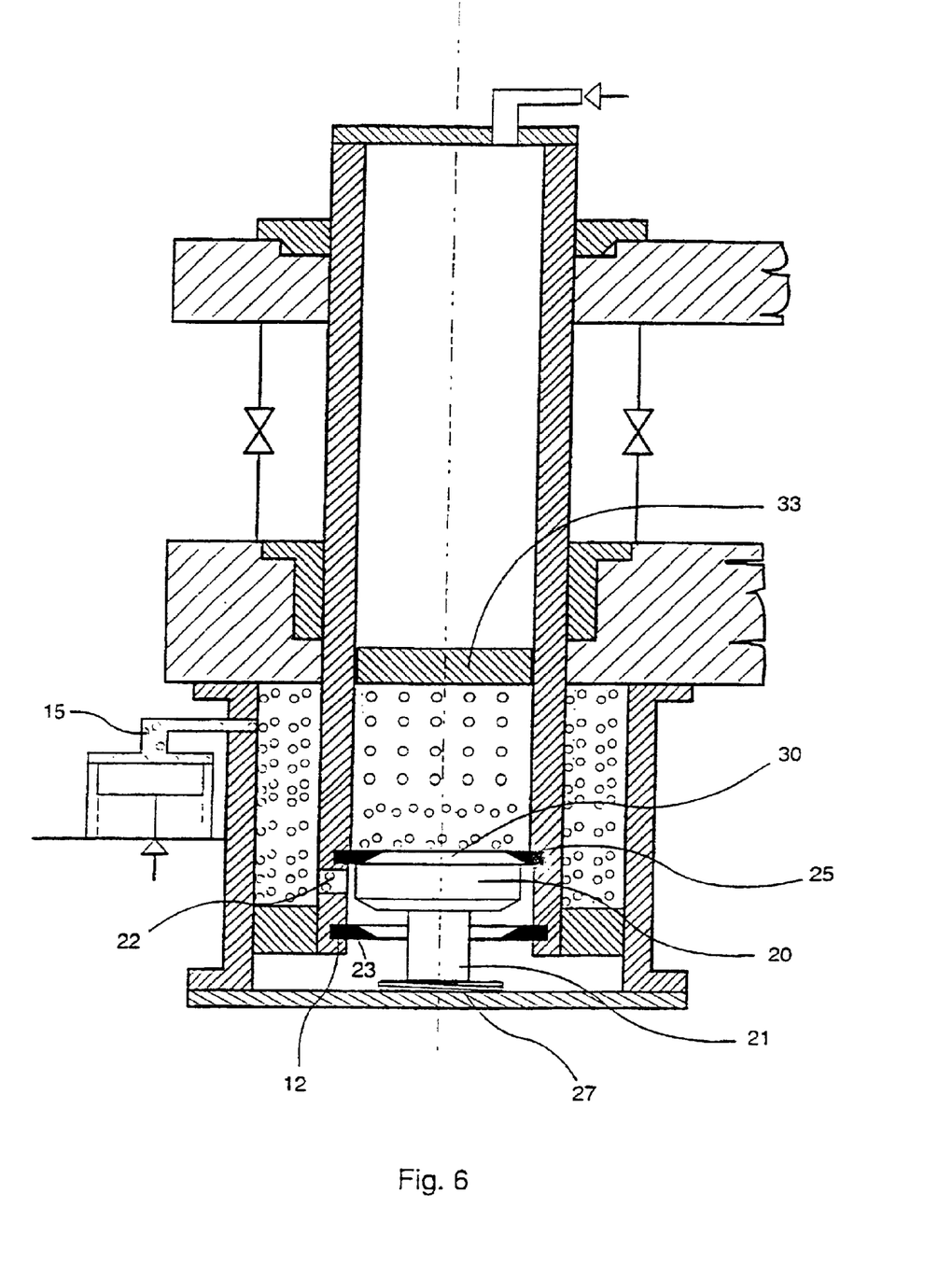
FIG. 6 shows a sixth phase of operation the press apparatus according to the present invention.

Dimensions of various aforedescribed members are such that, when the piston 13 and, as a result, also the guide column 10 are displaced to their lower positions, as is illustrated in FIGS. 5 and 6, an upper portion of the plunger-type piston plugs the through-bore 22, and when the piston 13 raises to a sufficiently high position, as is illustrated in FIGS. 1, 2 and 3, the plunger-type piston, which is a floating piston, remains in a lowered position by action of gravity and, as a consequence, leaves the through-bore 22 open.

The operating mode, as anyone skilled in the art is at this point capable of realizing, is as follows:

In a first phase (FIG. 1), the guide column 10, and therefore also the piston 13, are completely raised; hydraulic fluid at an appropriate pressure is introduced from the conduit of the cylinder 3 so as to cause the two plates 1 and 2 to move closer to each other; the plunger-type or floating piston is in a lowered position with respect to the through-bore 22 which, as a result, is left clear and open so as to enable oil to flow from the inner cylindrical cavity 18, whose volume is decreasing gradually because of the upper plate 1 being caused to move downwardly, to the inner volume 16 of the cylinder 7.

The floating or plunger type piston does not fall back to a bottom of the hollow cylinder 7, but is rather retained within the inner cylindrical cavity 18 by action of an inner, preferably frusto-conical, lower crown-like ring 23 which is arranged below the through-bore 22 and is adapted to stop the floating piston at a certain lower position thereof by interference with the upper cylindrical portion 20 thereof.

In an advantageous manner, also a lower edge 40 of the upper cylindrical portion 20 is shaped in a form of a frustum of cone so as to be able to perfectly fit against the frusto-conical shape of the crown-like ring 23, while a combination of a position of the crown-like ring and a height of the upper cylindrical portion of the floating piston is such that, when the upper cylindrical portion is brought to rest on the crown-like ring, the through-bore 22 remains clear and open.

A second phase (FIG. 2) may be considered as an intermediate oil transfer phase. Hydraulic fluid continues to be introduced into the [piston] cylinder 3 from the conduit 5 and this causes the guide column 10 and the piston 13 to move further downwardly, while the hydraulic fluid continues flowing as explained above.

In a third phase (FIG. 3) the guide column 10 continues lowering until a lower surface of the lower portion 21 of the plunger-type piston comes into contact with a bottom wall 24 of the hollow cylinder 7.

Figure 4:
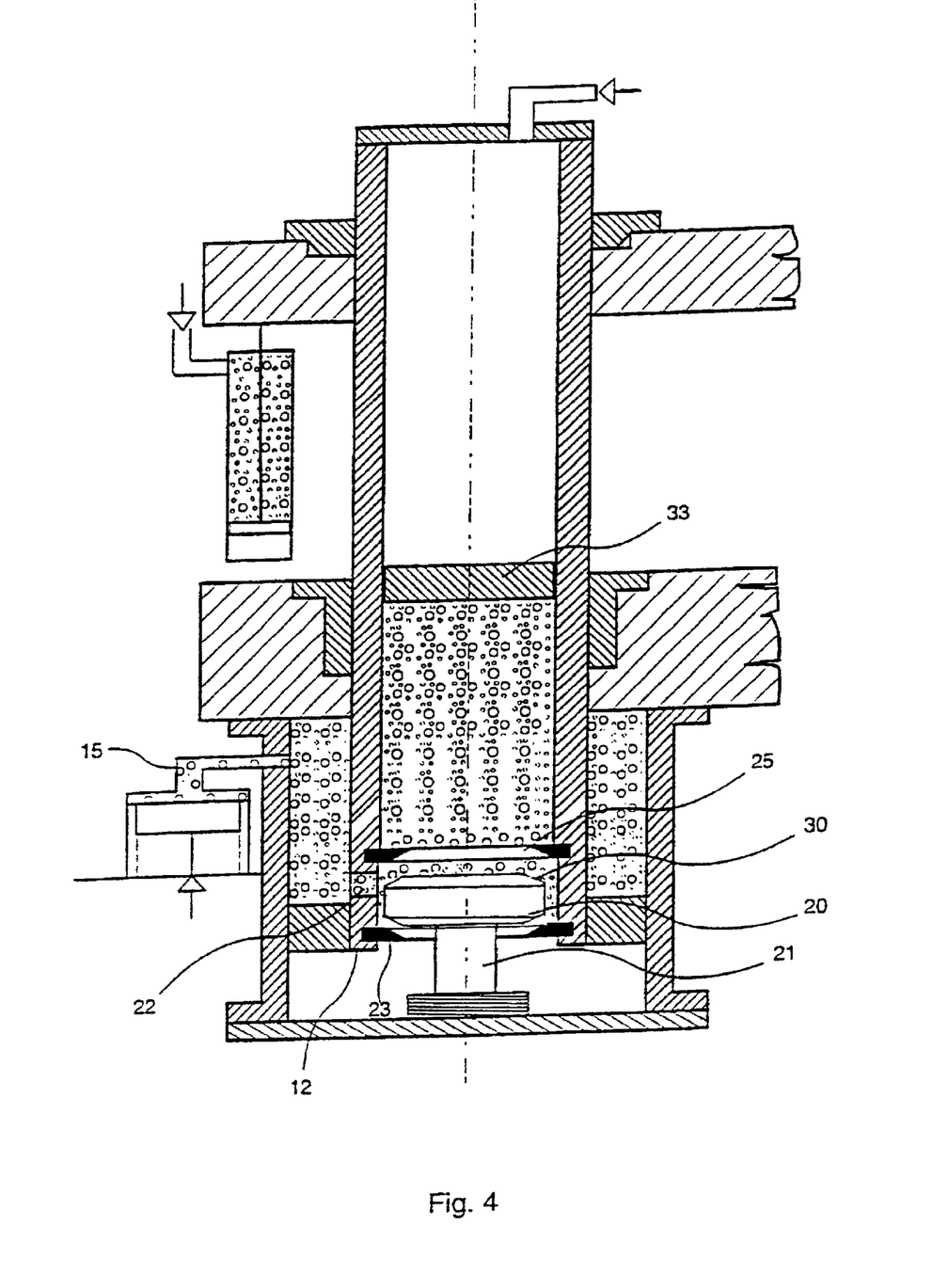
FIG. 4 shows a fourth phase of operation the press apparatus according to he present invention.

In a fourth phase (FIG. 4) the guide column 10 continues moving downwardly and, with it, the through-bore 22 which therefore moves closer to a level of the plunger-type piston, which is prevented from lowering any further via the lower portion 21 being in contact with the bottom wall 24. The through-bore 22, accordingly, begins to be plugged.

In a fifth phase (FIG. 5) the guide column 10 continues lowering to its bottom dead point.

In this position, in which a mold (not shown) is fully clamped, the through-bore 22 moves exactly in front of the upper cylindrical portion 20 of the plunger-type piston, which therefore results in the through-bore being plugged by the upper cylindral portion. As a result, any passage of hydraulic fluid towards the inner volume 16 ceases.

In order to prevent even a small amount of hydraulic fluid from being able to seep through the through-bore 22 into the cylindrical cavity 18 during a subsequent compression phase, there is provided a second annular, preferably frusto-conical, crown 25 arranged above the through-bore 22 and adapted to stop the floating piston in a definite lower position thereof by interference with the upper cylindrical portion 20.

In an advantageous manner, an upper edge 30 of the upper cylindrical portion 20 is shaped in a form of a frustum of cone so as to be able to perfectly fit against the frusto-conical shape of the upper crown-like ring 25, while a combination of a position of the upper crown-like ring with dimensions and position of the upper cylindrical portion of the floating piston is such that, when the floating piston is moved to its top dead point, mating frusto-conical shapes of the upper crown-like ring 25 and the upper cylindrical portion of the floating piston being brought to fit against each other actually prevents any hydraulic fluid from seeping through the through-bore 22.

Furthermore, in order to prevent abrupt shocks and excessive pressures between the mating frusto-conical shapes there is provided an elastic element 27 on the bottom wall 24 of the hollow cylinder 7, which elastic element the lower portion 21 of the plunger-type piston comes to lie against, and which is further capable of absorbing, i.e. taking up, any possible modest interference and/or excessive coupling pressure.

A sixth phase of operation (FIG. 6) is a phase in which maximum extent of compression of hydraulic fluid is brought about in view of keeping the mold firmly clamped against expanding pressure of a part being molded, which in fact would tend to cause the mold to open. This compression is brought about by virtue of per se known member 17 which is adapted to most quickly set the inner volume 16 under a high pressure by acting on hydraulic fluid through aperture 15 in the wall of the cylinder 7.

During this phase, the floating piston and the guide column 10 do not move, i.e. they remain still.

Figure 7:
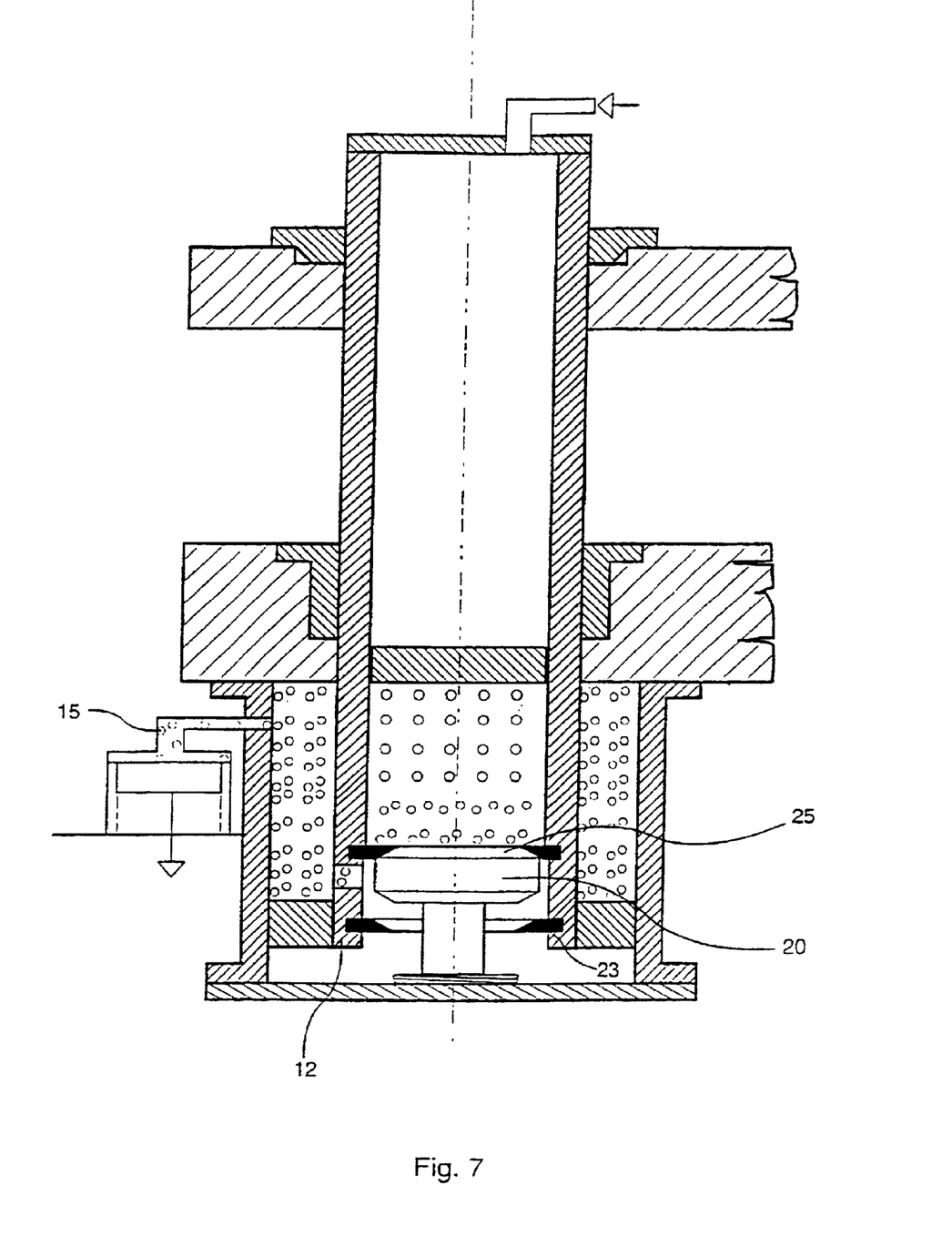
FIG. 7 shows a seventh phase of operation the press apparatus according to the present invention.

A subsequent seventh phase (FIG. 7) corresponds to an opposite sequence of the sixth phase. In other words, pressure generated by the member 17 is released, while the guide column 10 and the piston 13 do not yet move.

Figure 8:
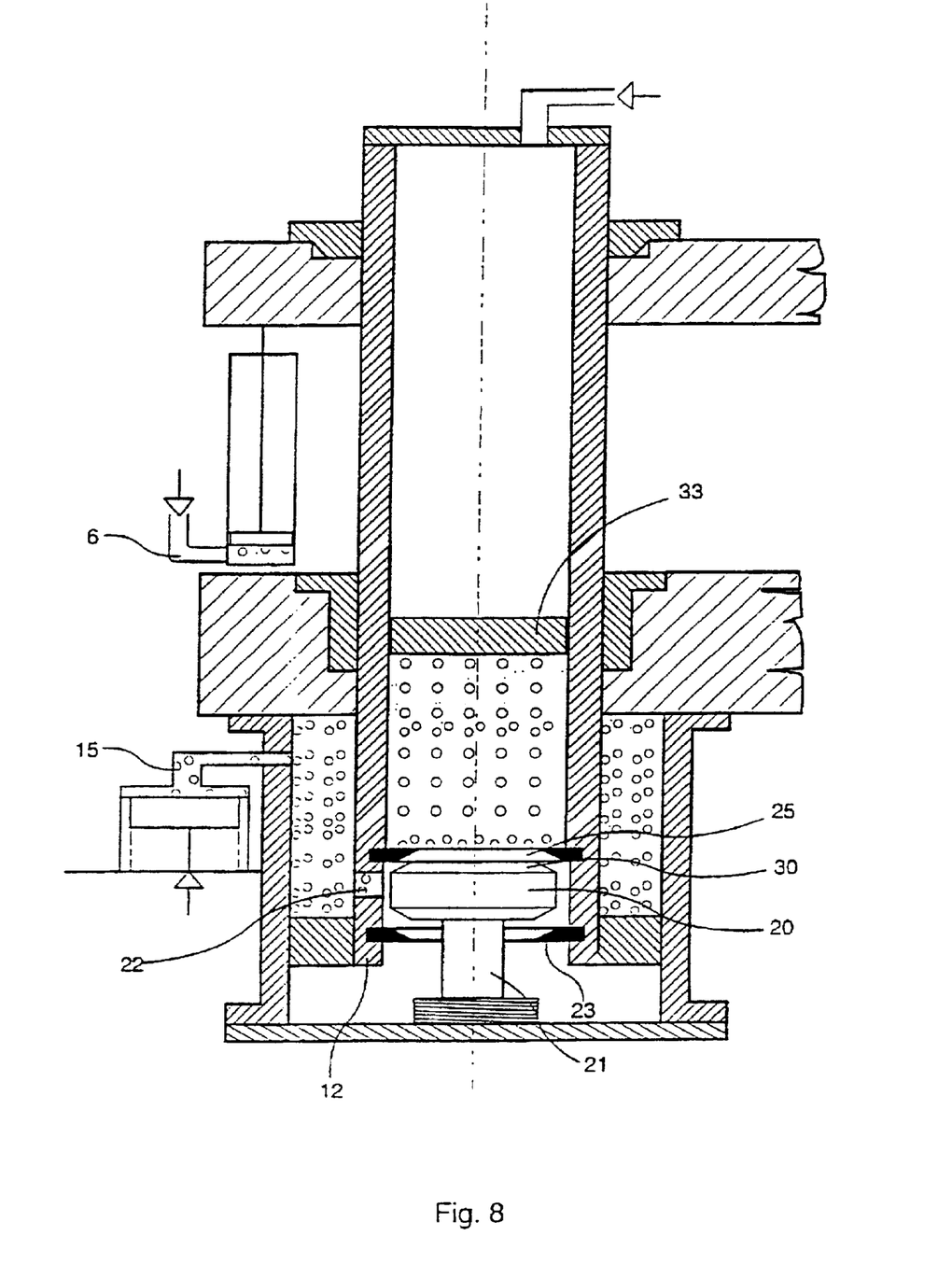
FIG. 8 shows an eighth phase of operation the press apparatus according to the present invention.

In a subsequent eighth phase (FIG. 8) hydraulic fluid begins to be pumped into the conduit 6 of the cylinder 3, and this causes the upper plate 2, and therefore also the guide column 10, to move upwardly and pressure on the elastic element 27 to be released by the floating piston because of action of the upper crown-like ring 25 being lifted jointly with the guide column.

Figure 9:
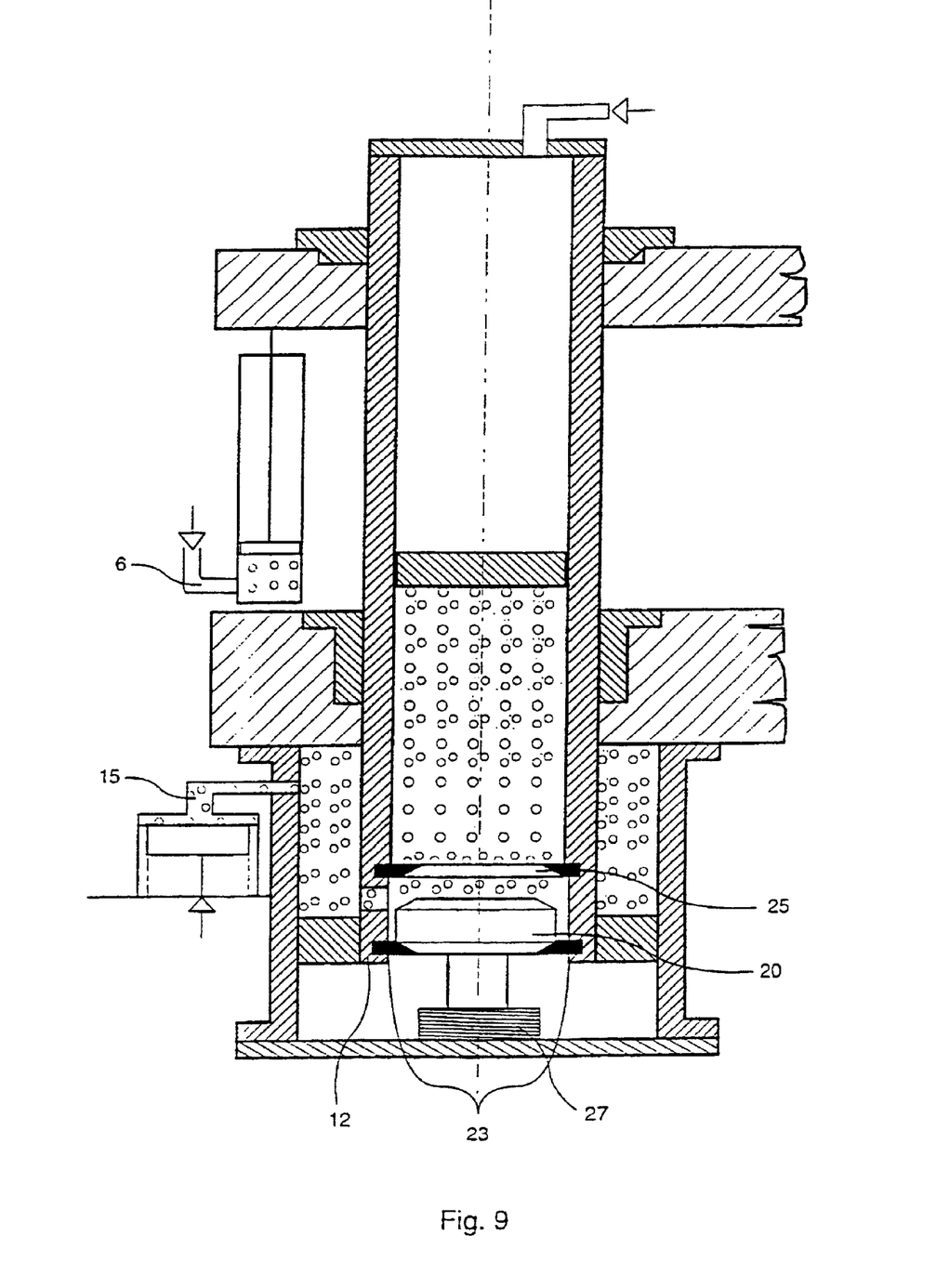
FIG. 9 shows a ninth phase of operation the press apparatus according to the present invention.

In a ninth phase (FIG. 9) the guide column 10 continues raising, while the lower crown-like ring 23 is raised until it comes into contact with the lower edge 40 of the upper cylindrical portion 20 of the floating piston; however, without causing the floating piston to begin moving upwardly yet. The through-bore 22 is opened as a result of the guide column 10 being so raised, and hydraulic fluid within the inner volume 16 is pushed and starts to flow into the inner cylindrical cavity 18.

Figure 10:
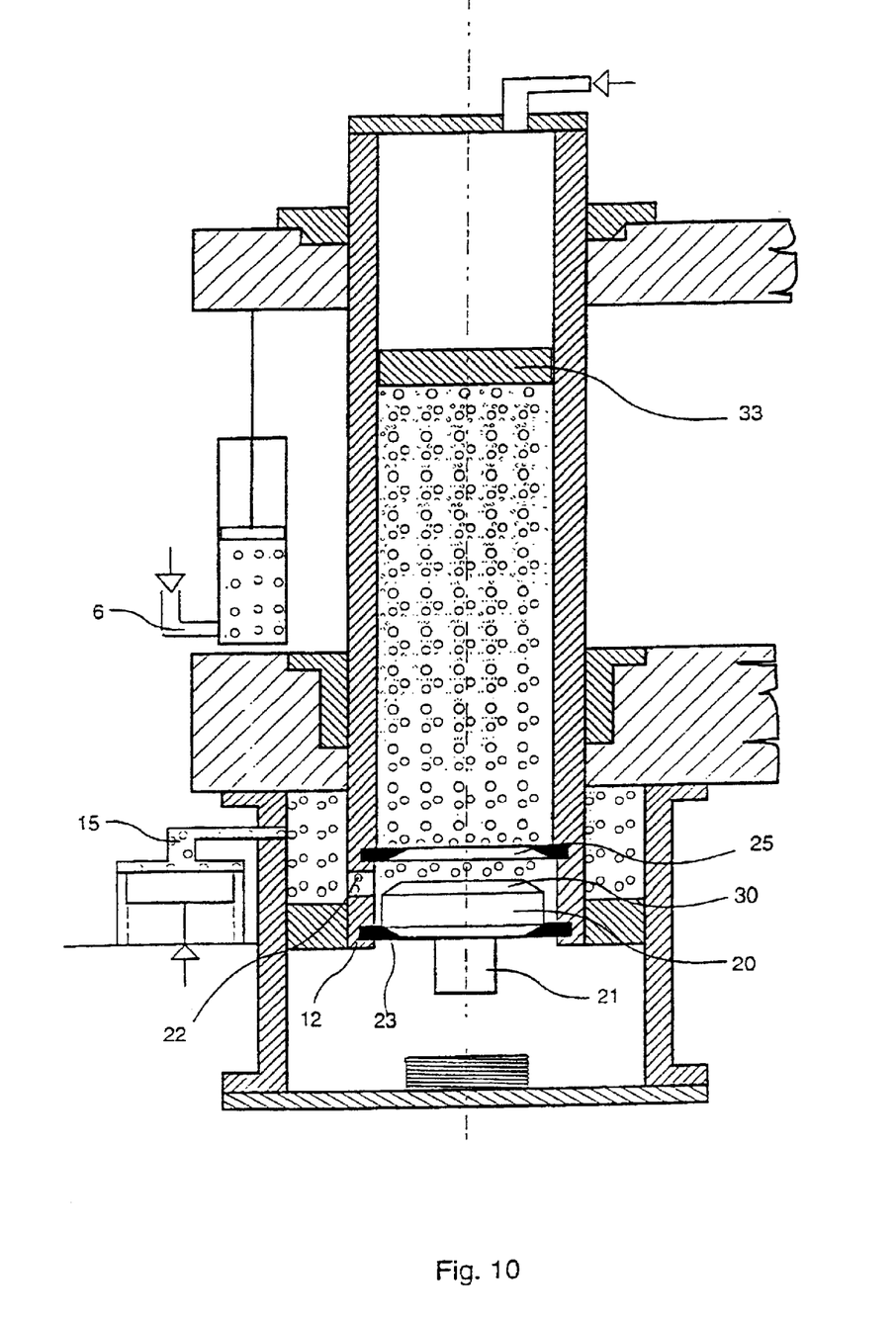
FIG. 10 shows a tenth phase of operation the press apparatus according to the present invention.

In a tenth phase (FIG. 10) the guide column 10 continues raising so as to cause the floating piston to rise by pulling it upwardly because of its having so engaged the lower crown-like ring 23, and hydraulic fluid continues flowing into the inner cylindrical cavity 18.

Figure 11:
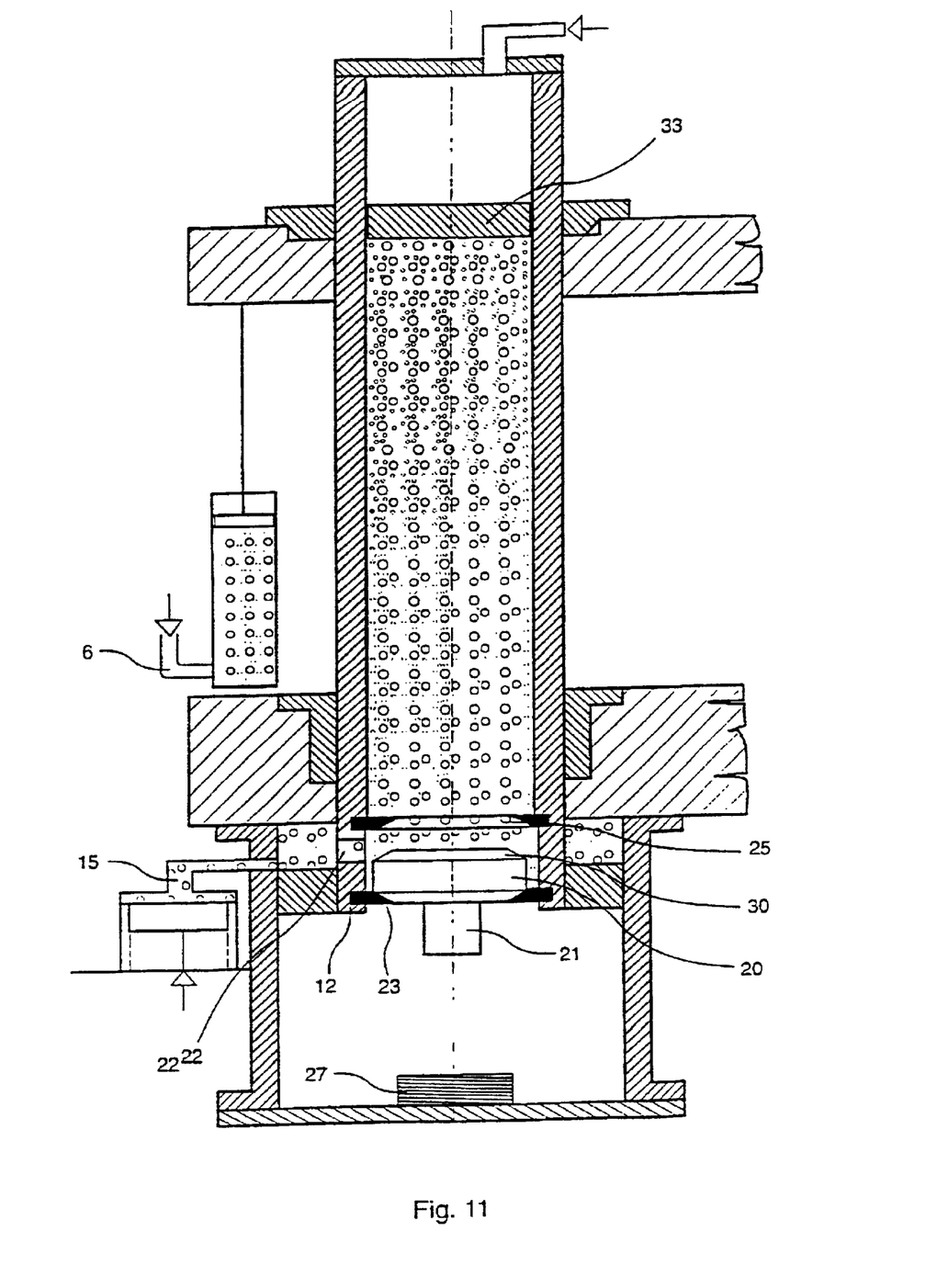
FIG. 11 shows an eleventh phase of operation the press apparatus according to the present invention.
Figures 12, 12A:
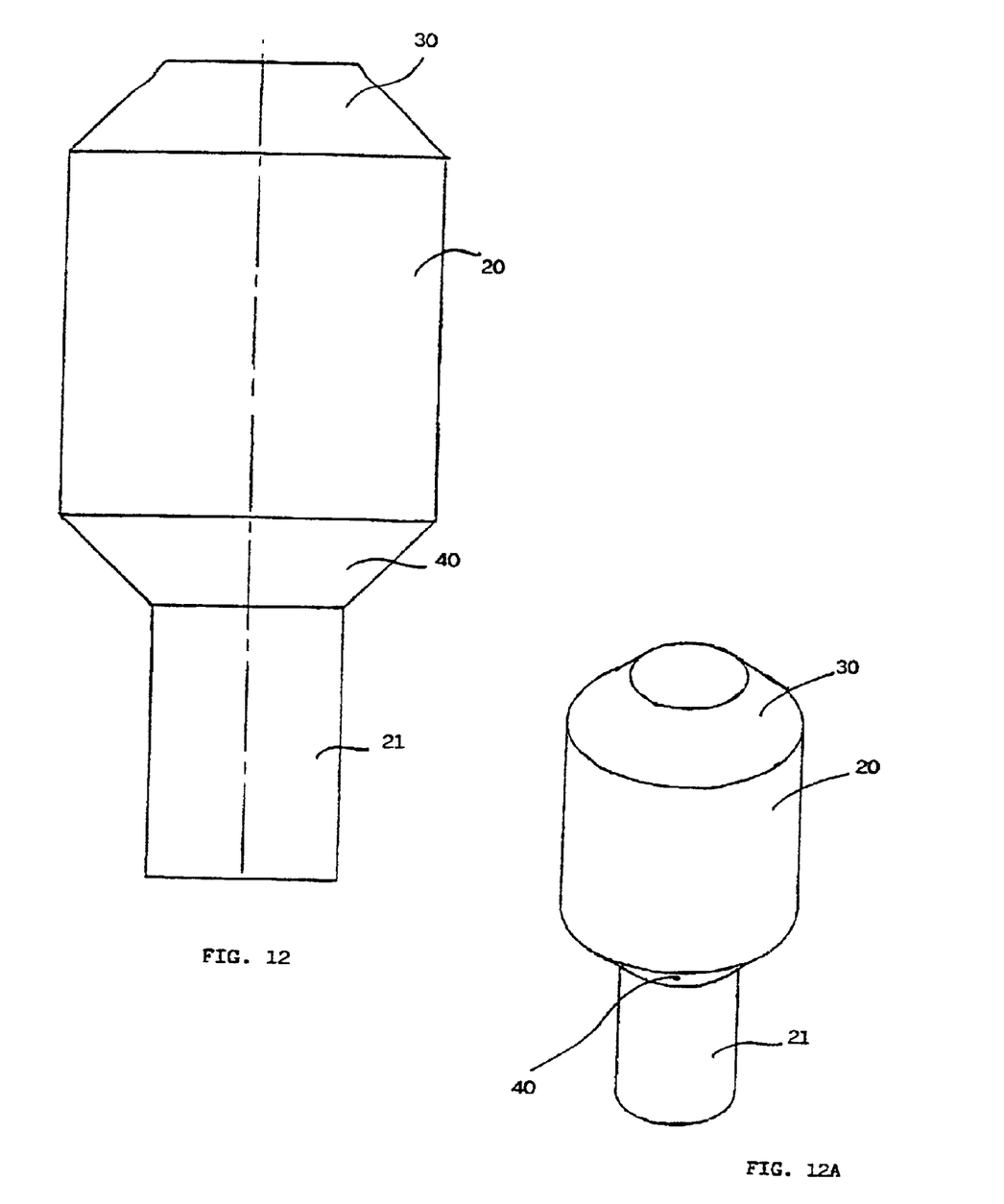
FIG. 12 is a cross-sectional view of a plunger piston of the press apparatus.
FIG. 12A is a perspective view of the plunger piston.

In a last, ie. eleventh phase (FIG. 11), the press regains a set-up position which is similar to the position illustrated in FIG. 1, i.e. the guide column 10 and the upper plate 1 reach a top dead center under a maximum extent of hydraulic fluid having been caused to flow. From this moment on, a new cycle can therefore begin from the afore-mentioned first phase.

Furthermore, in all FIGS. 1 through 11, there can be noticed presence of a cylindrical member 33 arranged as a plug over a level of hydraulic fluid in the cylindrical cavity 18. This cylindrical member 33 functions to prevent any excessive surface vorticity, in particular during phases in which the through-bore 22 is opened and closed. In view of promoting such a function, a volume of gas above the cylindrical member 33 is maintained under a slight pneumatic pressure, preferably through an appropriate conduit 35.

Advantages of the present invention are now quite apparent and may be summarized as follows:
  (i) smaller space taken up by the press apparatus because of maximum extent of efficiency in using inner volumes of the guide column 10;
  (ii) maximum extent of construction and functional simplicity deriving from elimination of any external hydraulic circuits; and
  (iii) elimination of controlled valves, under significant economic advantages deriving from elimination of related control and actuation circuits.

Moreover, a press apparatus according to the present invention can be implemented with use of materials and techniques that are readily available and fully known in the art, which furthermore show no criticality or difficulty in their utilization.

It shall be appreciated that the description and illustrations given above with reference to the accompanying drawings have been given by mere way of exemplification of the present invention, and that a number of variants and modifications can therefore be introduced thereto without departing from the scope of the present invention.

What is claimed is:
1. A hydraulic press apparatus comprising:
  a lower plate;
  an upper plate adapted to be driven toward said lower plate via operation of a motion a position control device;
  a hollow cylinder under said lower plate, said hollow cylinder having an upper edge tightly engaged with a lower surface of said lower plate;
  a guide column connected to said upper plate, said guide column having a lower end portion that defines a rod for a first piston adapted to slide within said hollow cylinder, and said guide column defining an inner cylindrical cavity that extends through said first piston, with said inner cylindrical cavity being filled with hydraulic fluid;
  a hole extending through said lower plate, said hole being adapted to slidably accommodate said guide column;
  an aperture in a side surface of said hollow cylinder, said aperture allowing a volume defined between said lower plate and said first piston to communicate with a hydraulic device that is adapted to apply a hydraulic pressure within said volume when said first piston is in a lower position;
  a plunger piston adapted to slide within said inner cylindrical cavity, said plunger piston including an upper cylindrical portion that has a diameter such that said upper cylindrical portion is capable of plugging said inner cylindrical cavity, said plunger piston also including a lower portion that has a diameter smaller than said diameter of said upper cylindrical portion so as to prevent said lower portion from contacting walls defining said inner cylindrical cavity; and
  a through-bore allowing said inner cylindrical cavity to communicate with said volume when said upper cylindrical portion is at a level that is beneath a level of said through-bore.

2. The hydraulic press apparatus according to claim 1, wherein
  a length of said upper cylindrical portion and a length of said lower portion are such that,
    (i) when said first piston is in the lower position, said upper cylindrical portion is positioned so as to plug said through-bore, and
    (ii) when said first piston is in a position corresponding to a position of greatest separation between said upper plate and said lower plate, said upper cylindrical portion is positioned so that at least a portion of said through-bore is not plugged by said upper cylindrical portion.

3. The hydraulic press apparatus according to claim 2, wherein
  said length of said upper cylindrical portion and said length of said lower portion are also such that when said first piston is in the lower position, said lower portion exerts a force against a bottom wall of said hollow cylinder.

4. The hydraulic press apparatus according to claim 3, further comprising:
  a resilient member on said bottom wall of said hollow cylinder and positioned between said bottom wall and said lower portion such that, when said first piston is in the lower position said lower portion exerts a force against said bottom wall of said hollow cylinder via said resilient member.

5. The hydraulic press apparatus according to claim 4, further comprising:
  a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

6. The hydraulic press apparatus according to claim 3, wherein said plunger piston further includes a first frusto-conical portion interconnecting said upper cylindrical portion and said lower portion, and further comprising:
  a first frusto-conical crown-like ring within said guide column, said first frusto-conical crown-like ring positioned at a level that is beneath said level of said through-bore and adapted to engage said first frusto-conical portion so as to prevent said plunger piston from being displaced downwardly beyond said first frusto-conical crown-like ring, wherein a height of said upper cylindrical portion is not more than a difference in height between an upper edge of said through-bore and said first frusto-conical crown-like ring, such that said upper cylindrical portion is not able to plug said through-bore when said plunger piston is located above and in contact with said first frusto-conical crown-like ring.

7. The hydraulic press apparatus according to claim 6, wherein said plunger piston further includes a second frusto-conical portion at an upper end of said upper cylindrical portion, and further comprising:

a second frusto-conical crown-like ring within said guide column, said second frusto-conical crown-like ring positioned at a level that is above said level of said through-bore and adapted to engage said second frusto-conical portion when said first piston is in the lower position.

8. The hydraulic press apparatus according to claim 7, further comprising:

a resilient member on said bottom wall of said hollow cylinder and positioned between said bottom wall and said lower portion such that, when said first piston is in the lower position said lower portion exerts a force against said bottom wall of said hollow cylinder via said resilient member.

9. The hydraulic press apparatus according to claim 8, further comprising:

a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

10. The hydraulic press apparatus according to claim 7, further comprising:

a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

11. The hydraulic press apparatus according to claim 6, further comprising:

a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

12. The hydraulic press apparatus according to claim 6, further comprising:

a resilient member on said bottom wall of said hollow cylinder and positioned between said bottom wall and said lower portion such that, when said first piston is in the lower position said lower portion exerts a force against said bottom wall of said hollow cylinder via said resilient member.

13. The hydraulic press apparatus according to claim 12, further comprising:

a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

14. The hydraulic press apparatus according to claim 3, wherein said plunger piston further includes a frusto-conical portion at an upper end of said upper cylindrical portion, and further comprising:

a frusto-conical crown-like ring within said guide column, said frusto-conical crown-like ring positioned at a level that is above said level of said through-bore and adapted to engage said frusto-conical portion when said first piston is in the lower position.

15. The hydraulic press apparatus according to claim 14, further comprising:

a resilient member on said bottom wall of said hollow cylinder and positioned between said bottom wall and said lower portion such that, when said first piston is in the lower position said lower portion exerts a force against said bottom wall of said hollow cylinder via said resilient member.

16. The hydraulic press apparatus according to claim 15, further comprising:

a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

17. The hydraulic press apparatus according to claim 14, further comprising:

a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

18. The hydraulic press apparatus according to claim 3, further comprising:

a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

19. The hydraulic press apparatus according to claim 2, wherein said plunger piston further includes a first frusto-conical portion interconnecting said upper cylindrical portion and said lower portion, and further comprising:

a first frusto-conical crown-like ring within said guide column, said first frusto-conical crown-like ring positioned at a level that is beneath said level of said through-bore and adapted to engage said first frusto-conical portion so as to prevent said plunger piston from being displaced downwardly beyond said first frusto-conical crown-like ring, wherein a height of said upper cylindrical portion is not more than a difference in height between an upper edge of said through-bore and said first frusto-conical crown-like ring, such that said upper cylindrical portion is not able to plug said through-bore when said plunger piston is located above and in contact with said first frusto-conical crown-like ring.

20. The hydraulic press apparatus according to claim 19, wherein said plunger piston further includes a second frusto-conical portion at an upper end of said upper cylindrical portion, and further comprising:

a second frusto-conical crown-like ring within said guide column, said second frusto-conical crown-like ring positioned at a level that is above said level of said through-bore and adapted to engage said second frusto-conical portion when said first piston is in the lower position.

21. The hydraulic press apparatus according to claim 20, further comprising:
a resilient member on a bottom wall of said hollow cylinder and positioned between said bottom wall and said lower portion such that, when said first piston is in the lower position said lower portion exerts a force against said bottom wall of said hollow cylinder via said resilient member.

22. The hydraulic press apparatus according to claim 21, further comprising:
a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

23. The hydraulic press apparatus according to claim 20, further comprising:
a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

24. The hydraulic press apparatus according to claim 19, further comprising:
a resilient member on a bottom wall of said hollow cylinder and positioned between said bottom wall and said lower portion such that, when said first piston is in the lower position said lower portion exerts a force against said bottom wall of said hollow cylinder via said resilient member.

25. The hydraulic press apparatus according to claim 24, further comprising:
a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

26. The hydraulic press apparatus according to claim 19, further comprising:
a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

27. The hydraulic press apparatus according to claim 2, wherein said plunger piston further includes a frusto-conical portion at an upper end of said upper cylindrical portion, and further comprising:
a frusto-conical crown-like ring within said guide column, said frusto-conical crown-like ring positioned at a level that is above said level of said through-bore and adapted to engage said frusto-conical portion when said first piston is in the lower position.

28. The hydraulic press apparatus according to claim 27, further comprising:
a resilient member on a bottom wall of said hollow cylinder and positioned between said bottom wall and said lower portion such that, when said first piston is in the lower position said lower portion exerts a force against said bottom wall of said hollow cylinder via said resilient member.

29. The hydraulic press apparatus according to claim 28, further comprising:
a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

30. The hydraulic press apparatus according to claim 27, further comprising:
a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

31. The hydraulic press apparatus according to claim 2, further comprising:
a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

32. The hydraulic press apparatus according to claim 1, further comprising:
a cylindrical member in said guide column, said cylindrical member defining an interior of said guide column into said inner cylindrical cavity and a volume above said cylindrical member, with said volume above said cylindrical member being for containing a gas that is to be pressurized via an external conduit.

* * * * *